(12) United States Patent
Miura et al.

(10) Patent No.: US 6,530,453 B1
(45) Date of Patent: Mar. 11, 2003

(54) SOUND ABSORBING STRUCTURE

(75) Inventors: Hiroaki Miura, Yokosuka (JP); Kouichi Nemoto, Zushi (JP); Shinkichi Torii, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 10 days.

(21) Appl. No.: 09/709,737

(22) Filed: Nov. 13, 2000

(30) Foreign Application Priority Data

Nov. 11, 1999 (JP) ............................ 11-321051
Mar. 22, 2000 (JP) ........................ 2000-080399

(51) Int. Cl.[7] .................................. E04B 1/82
(52) U.S. Cl. ................... 181/292; 181/290; 181/293
(58) Field of Search ................... 181/292, 293, 181/290, 286, 295, 294

(56) References Cited

U.S. PATENT DOCUMENTS

| 3,910,374 | A | * | 10/1975 | Holehouse | 181/292 |
| 4,244,439 | A | * | 1/1981 | Wested | 181/210 |
| 4,465,725 | A | * | 8/1984 | Riel | 181/292 |
| 5,545,861 | A | * | 8/1996 | Morimoto | 181/290 |
| 6,179,086 | B1 | * | 1/2001 | Bansemir et al. | 181/198 |

FOREIGN PATENT DOCUMENTS

JP  08-301024  11/1996
JP  10-018471  1/1998

OTHER PUBLICATIONS

Japanese Industrial Standard A 1405, "Methods of Test for Sound Absorption of Acoustical Materials by the Tube Method," Established by Minister of International Trade and Industry, Date of Establishment: Mar. 1, 1963 (Translated and published by Japanese Standards Association).

* cited by examiner

*Primary Examiner*—Robert E. Nappi
*Assistant Examiner*—Kim Lockett
(74) *Attorney, Agent, or Firm*—Foley & Lardner

(57) ABSTRACT

A flat acoustic resin insulator (A) is one-shot molded, with a sound absorbing structure composed of a rigid-connected combination of a plurality of independent sound absorbing cells each constituted with a mold cavity (C) defined by a rigid lateral wall (E), a rigid bottom wall (F), and a vibratory top surface layer (H), and an opening (B) formed through the surface layer (H) for acoustic external communication of the mold cavity (C). The opening (B) cooperates with the mold cavity (C) to serve for resonance absorption of sounds, and the surface layer (H) covering the mold cavity (C) serves for film-vibratory absorption of sounds. Characteristic curves of the resonance sound-absorption and the film-vibratory sound-absorption have their peaks at different audible frequencies and their slopes overlapping therebetween, with a superimposed sound-absorbing effect over a wide frequency range.

9 Claims, 9 Drawing Sheets

SOUND ABSORBING STRUCTURE

BACKGROUND OF THE INVENTION

The present invention relates to a sound absorbing structure for an acoustic insulator to perform acoustic insulation or sound absorption, and in particular, to a sound absorbing resin structure with an increased sound absorbing performance, for example, a sound absorbing structure suitable for use as a plate-form part, such as a vehicular body part or interior part.

There are known sound absorbing resin structures implemented for sound absorption by resonance in a hollow or void, or by vibration of a film or membrane. As an exemplary sound absorbing structure by resonance absorption, there is a vehicular resonator, which has a disadvantageously large volume. In addition, the resonator, which is a single body with a single peak of sound absorption, needs to be multiplicated with different volumes to have a sound absorbing structure adapted for sound absorption over a wide frequency range. Such a sound absorbing resin structure with a large volume can, however, be easily molded by a blow molding process, with a rigid structure as well.

On the other hand, a sound absorbing structure using a film, which can be molded in a flat form with ease, tends to have a lower rigidity than the sound absorbing structure by resonance absorption, and needs to be reinforced with an increased thickness or by provision of ribs for a specified rigidity to be secured, in addition to the practical necessity of a back air layer to be provided with measures, such as a partitioning wall, for holding the air layer.

There have been proposed sound absorbing structures using a flat-form member and additionally provided with a function of resonance absorption. In Japanese Patent Application Laid-Open Publication No. 10-18471, there is disclosed a sound absorbing structure in which a perforated flat plate and a corrugate mold plate are superposed on each other, with various volumes of voids formed therebetween. Disclosed in Japanese Patent Application Laid-Open Publication No. 8-301024 is a sound absorbing structure in which a plurality of sheets formed with through holes are laminated with air layers in between.

SUMMARY OF THE INVENTION

The sound absorbing structure by resonance absorption can be molded to be rigid with ease, but tends to be large-sized as a whole, and is hardly moldable into a flat form, as a problem. To the contrary, the sound absorbing structure with a sound absorbing film can be molded into a flat form with ease. However, in configuration for adaptation to have an increased rigidity or secured air layers, this structure has commensurate disadvantages in weight or molding feasibility, as a problem.

On the other hand, the sound absorbing structure using a flat-form member and additionally provided with a function of resonance absorption, which has a plurality of laminated plate members, needs adhesion or welding for connection between the plate members after their molding, taking time and cost for production, as a problem.

There thus has been desiderated an improvement for enhancement of sound absorbing performance and strength as well as molding feasibility in the conventional art described, in particular of a sound absorbing structure in terms of a substantially flat one-shot resin mold hollowed with a plurality of separate internal voids having their external openings for their independent external communication on at least one of front and rear sides of the flat mold to effect frequency adjustment or control.

The present invention has been made with such points in view. It therefore is an object of the invention to provide a sound absorbing structure of a resin mold with a plurality of internal voids having openings for external communication at a one-side surface of the mold, which allows for a sound absorbing performance to be achieved over a wide frequency range, a light-weight rigid structure to be obtained in a facilitated manner, a low-cost molding to be performed with ease, and an extensive application covering a wet environment as well as those places difficult of installation of ordinary fiber-make sound absorbing structures.

To achieve the object, an aspect of the invention provides a sound absorbing structure of a resin mold with a plurality of internal voids having openings for external communication at a one-side surface of the mold, wherein a respective internal void has a sectional area parallel to the one-side surface and larger than a corresponding opening and is defined by a surface part formed with the corresponding opening, the respective internal void and the corresponding opening constitute a resonance sound-absorption structure for sound absorption by resonance, and the surface part constitutes a film sound-absorption structure for sound absorption by film.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
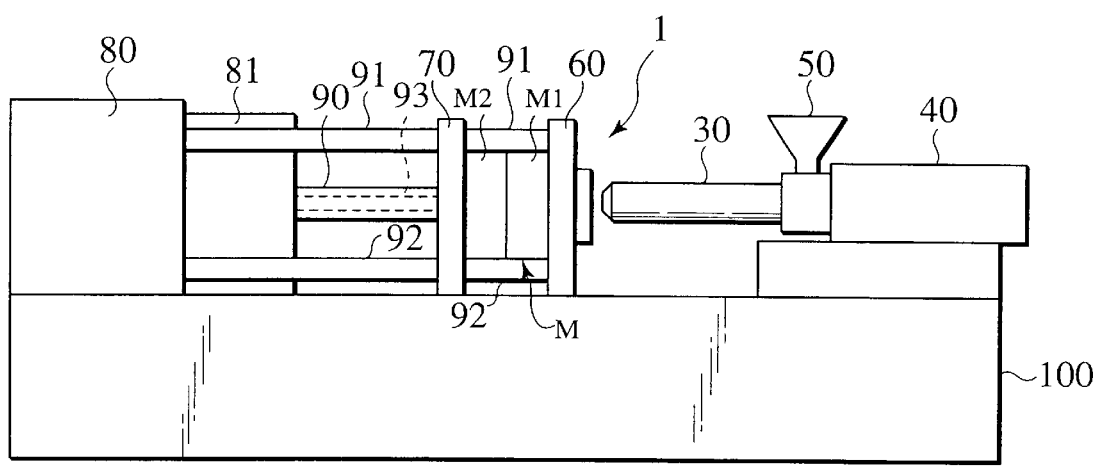
FIG. 1 is a schematic elevation of a molding apparatus having a die for molding a flat acoustic insulator with a sound absorbing structure according to an embodiment of the invention.

There will be detailed below a flat acoustic insulator for automobile use as a rigid resin mold having a sound absorbing cavity structure according to a preferred embodiment of the present invention, as well as how to mold the acoustic insulator and the principle of sound absorption, with reference made to the accompanying drawings. Like members and elements are designated by like reference characters.

It should be noted that the sound absorbing structure naturally has a significant sound shielding characteristic, and a member with this structure preferably constitutes an acoustic insulator, which may well be flat like a plate for automobile use, such as a wall part or liner of a vehicular interior part, engine compartment, etc.

Figure 5:
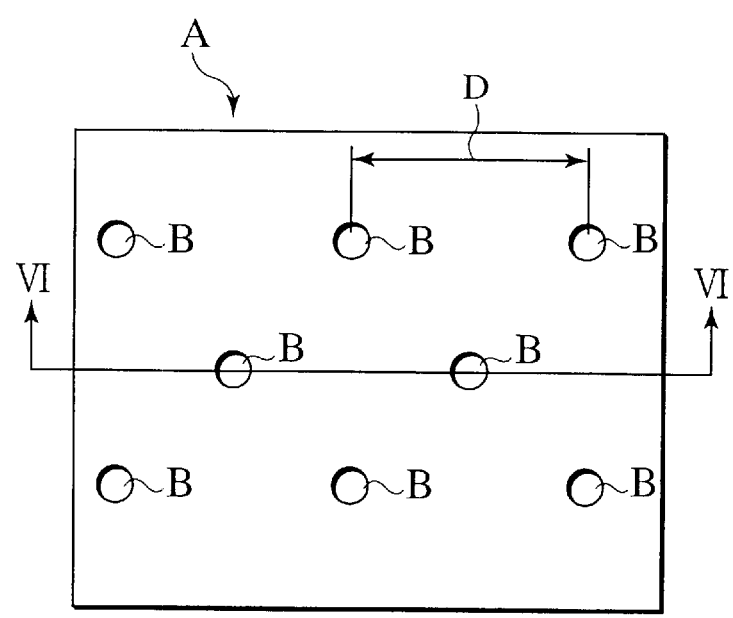
FIG. 5 is a front view of the flat acoustic insulator.
Figure 6:
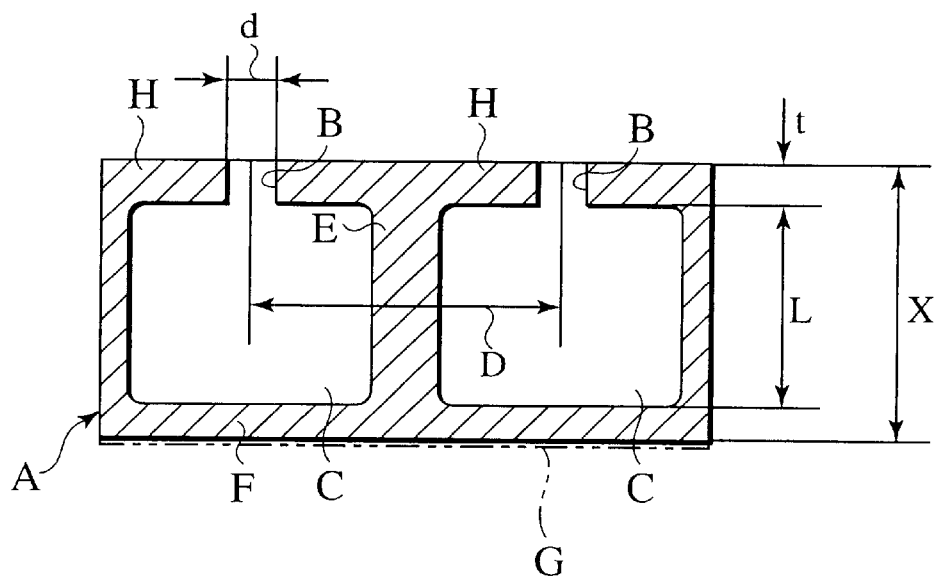
FIG. 6 is a section along line VI—VI of FIG. 5.
Figure 7:
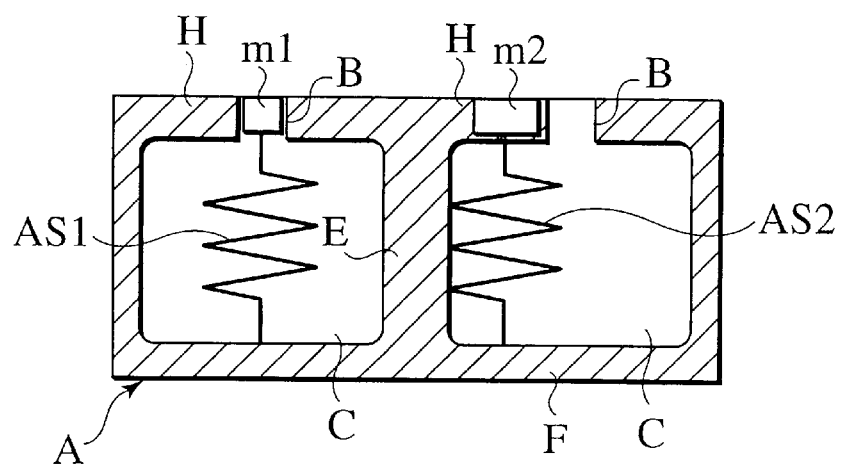
FIG. 7 is like the section to FIG. 6, describing the principle of sound absorption according to the invention.

FIG. 1 shows a molding apparatus 1 having a later-described metallic mold die M shown in FIG. 2, for molding a flat acoustic insulator A shown in FIG. 5, with a sound absorbing structure of which the configuration and dimensions are shown in FIG. 6, and the principle of sound absorption is depicted in FIG. 7.

As shown in FIG. 1, the molding apparatus 1 has, in addition to the mold die M, a resin heater 30 as a barrel for heating a quantity of resin grains supplied therein to be molten, an injection cylinder 40 for pushing a quantity of molten resin to be injected from inside the heater 30 into the die, a hopper 50 for supplying resin grains to the resin heater 30, a stationary platen 60 normally fixed in position on a base structure 100, a mobile platen 70 movable along a pair of guide rails on the base structure 100, and an instrumented rigid structure 80 provided with a hydraulic and/or pneumatic unit and a fluid cylinder set 81 including a die clamp cylinder 90 and a die cavity control cylinder 93. The base structure 100 has an apparatus control panel installed therein for compact design. The die clamp cylinder 90 is connected to the mobile platen 70. Preferably, the rigid structure 80 may be connected with the stationary platen 60 by front and rear pairs of upper and lower tie rods 91, 92 extending through guide holes or guide recesses formed in the mobile platen 70.

Figure 2:
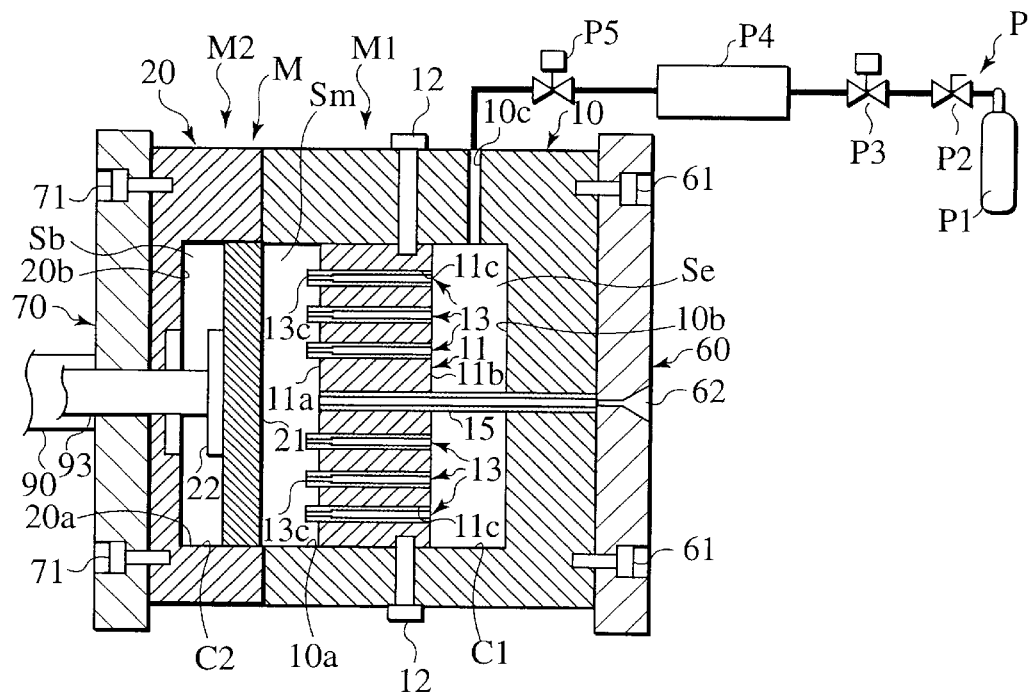
FIG. 2 is a combination of a sectional view of the die and a block diagram of an associated gas supply system of the molding apparatus, as it is ready for resin injection.

As shown in FIG. 2, the mold die M is constituted with an "assembly of stationary die segments" (hereinafter called "stationary die assembly") M1 fixed to the stationary platen 60, and an "assembly of mobile die segments" (hereinafter called "mobile die assembly") M2 mounted on the mobile platen 70.

Figure 4:
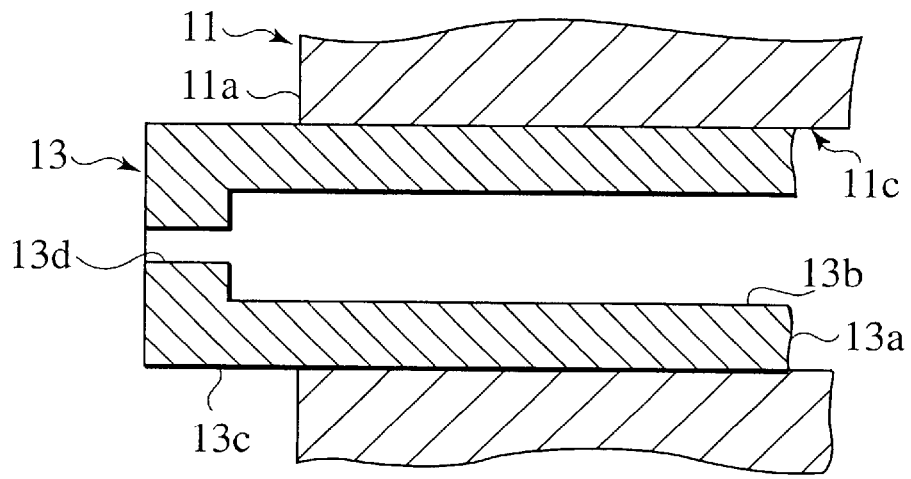
FIG. 4 is a sectional view of a gas discharge nozzle of the die.

The stationary die assembly M1 includes: a stationary die 10 fastened to the stationary platen 60 by bolts 61 and formed with a single chamber C1 opening leftward in the figure and identical in configuration of vertical section to an outline of the acoustic insulator A; a chamber-partitioning stationary die segment 11 fitted gas-tight in a longitudinally middle part of the chamber C1 and fastened to the stationary die 10 by bolts 12; a plurality of gas nozzles 13 provided through the die segment 11 for discharging a molding gas, e.g. an inert gas such as a nitrogen gas, from a gas discharge condition (e.g. pressure and/or temperature) equalizing zone Se, which is defined by a right part of a rectangular circumferential wall 10a and a flat right end wall 10b of the chamber C1 and a flat right end wall 11b of the die segment 11, to an expandable die cavity Sm, which is defined by a left part of the rectangular circumferential wall 10a and a flat left wall 11a of the die segment 11 and open to the left; and a tubular molten resin runner 15 provided through the stationary die 10 and a central part of the die segment 11, for intercommunication between a molten resin inlet 62 formed in the stationary platen 60 and a right end region of the die cavity Sm. The discharge condition equalizing zone Se is connected, through a communication port 10c in the stationary die 10, with a gas supply line P that has a molding gas supply source P1 such as a gas bomb or tank, a gas pressure control or regulation valve P2, and a gas heater P4 provided with electromagnetic upstream and downstream shutoff valves P3, P4 to be independently controlled for adequate supply of heated molding gas in synchronism with an injection of molten metal through the resin runner 15. As illustrated in FIG. 4, each gas nozzle 13 is hermetically fixed in a nozzle installation port 11c formed through the die segment 11, and has a tubular nozzle part 13a defining a straight gas passage 13b communicating with the equalizing zone Se, and a nozzle tip part 13c formed with a gas discharge orifice 13d as a reduced outlet of the gas passage 13b. The nozzle tip part 13c projects leftward beyond the left wall 11a of the die segment 11, but may preferably be set back rightward, inside the nozzle installation port 11c.

The mobile die assembly M2 includes: a mobile die 20 fastened to the mobile platen 70 by bolts 71 and formed with a single chamber C2 opening rightward in FIG. 2 and identical in configuration of vertical section to the outline of the acoustic insulator A; and a sliding die segment 21 slidably fitted gas-tight in the chamber C2. The die segment 21 defines at a flat right side thereof a left end of the die cavity Sm, when prepared for resin injection. A left side of the die segment 21 is cooperative with a left part of a rectangular circumferential wall 20a and a left end wall 20b of the chamber C2 to define a compressible zone Sb, where a rod end of the die cavity control cylinder 93 is inserted to be connected by a joint 22 to the die segment 21. The left end wall 20b has a recess for reception of the joint 22. The compressible zone Sb may be set to a vacuum or atmospheric pressure, or may be pressurized to work as a cushion.

In normal molding operation before and after a later-described die cavity control associated with a gas discharge, the die clamp cylinder 90 is operated in unison with the die cavity control cylinder 93. This cylinder 93 is thus independently operated simply when expanding the die cavity Sm, as well as when resetting the stationary die assembly M2.

Normally, the slidable die segment 21 is kept in a right end position, where its right side is substantially flush with a rectangular right end of the mobile die 20. Therefore, when the mold die M is closed for preparation by advance operations of the die clamp cylinder 90 and the cavity control cylinder 93, the die cavity Sm is entirely closed by combination of the stationary die 10, the stationary die segment 11, and the slidable die segment 21, as shown in FIG. 2.

Figure 3:
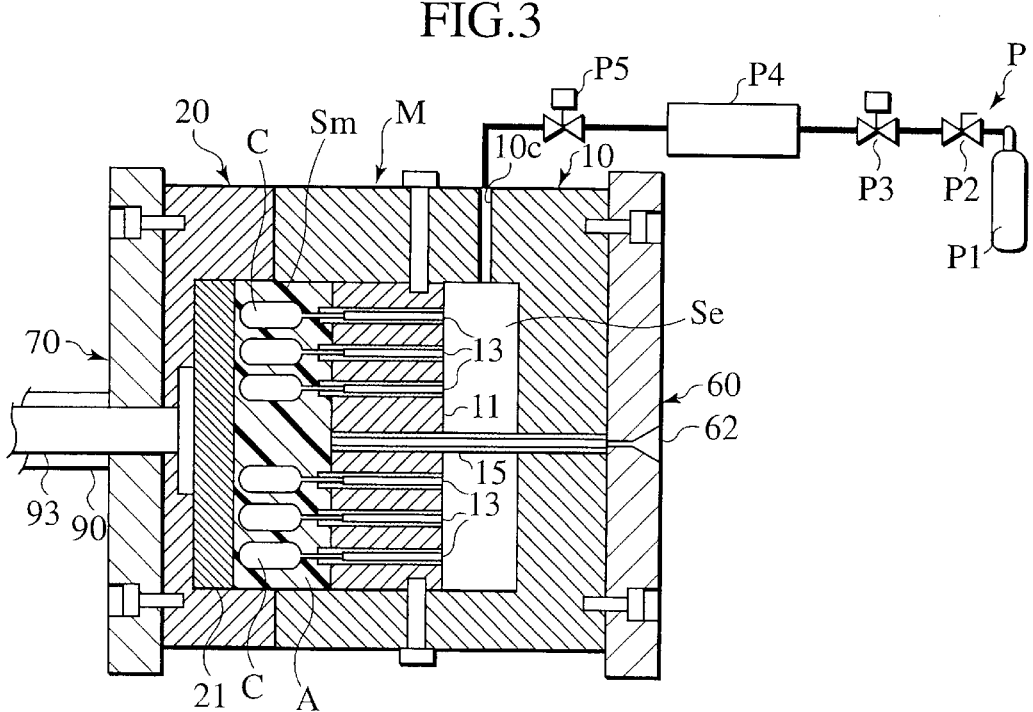
FIG. 3 is like the combination to FIG. 2, as it illustrates a condition of the die after the resin injection accompanied by a gas discharge.

For expansion of the prepared die cavity Sm, the slidable die segment 21 is moved leftward by retreat operation merely of the control cylinder 93 as illustrated by FIG. 3, where an expanded volume of the die cavity Sm is defined by combination of the stationary die 10, the stationary die segment 11, the mobile die 20, and the slidable die segment 21.

The flat acoustic insulator A shown in FIG. 5 is molded by the expanded die cavity Sm, as shown in FIG. 3, with a sound absorbing structure shown in FIG. 6 and comprised of: a plurality of mold cavities C which are each formed in a body of molten resin (that is injected into the die cavity Sm in a one-shot through the molten resin runner 15) by a volume of molding gas discharged from a corresponding gas nozzle 11, and which are each defined by a connected combination of a mold cavity isolating rigid wall E, a surface part H as a vibratory resin film at a front side of the acoustic insulator A, and a rigid bottom wall F at a back or rear side of the acoustic insulator A; and a plurality of resonant openings B which are each formed by a circumference of the nozzle tip part 13c of an associated gas nozzle 13 and provided through a central region of the surface part H of a corresponding mold cavity C for intercommunication between this cavity C and outside of the acoustic insulator A. As apparent from FIG. 6, each opening B is smaller in cross sectional area than a cross section of a corresponding mold cavity C taken along a plane parallel to the front side of the acoustic insulator A.

The flat acoustic insulator A has a thickness X equivalent to a depth of the expanded die cavity Sm, that is a distance between the stationary die segment 11 and the slidable segment 21 in a leftmost retreat position. Respective neighboring openings B are disposed at proper center-to-center distances D in correspondence to a designed arrangement of associated gas nozzles 13. Each opening B has an inside diameter d identical to an outside diameter of the nozzle tip part 13c, and a length equivalent to a thickness t of surface part H. Mold cavities C are assumed to have a substantially cylindrical form with a depth L equivalent to a difference between the insulator thickness X and a sum of the thickness t of surface part H and a thickness of the bottom wall F. The acoustic insulator A may have an additional resin lamination G integrally formed at least on the rear side thereof after a molding of the sound absorbing structure. The resin lamination G may consist of a plurality of resin layers including a layer to be painted. The resin lamination G may have a resin film joined thereto to have an enhanced appearance or quality and a raised marketability. The resin film may be ornamented with a decorative design, resistive to rubbing or wear, or lustrous.

The acoustic insulator A is made of a resin material to be sufficiently fluid when heated for molding, which may be a thermoplastic resin or thermosetting resin. The thermoplastic resin is preferable, as the time for cavity formation can be set with ease. In the case of a thermosetting resin, the hardness is adjustable by catalyst selection, quantity, heating temperature, etc. The resin may be a reinforced type with blended talc, calcium carbonate, glass fiber, organic fiber, etc.

Figure 8:
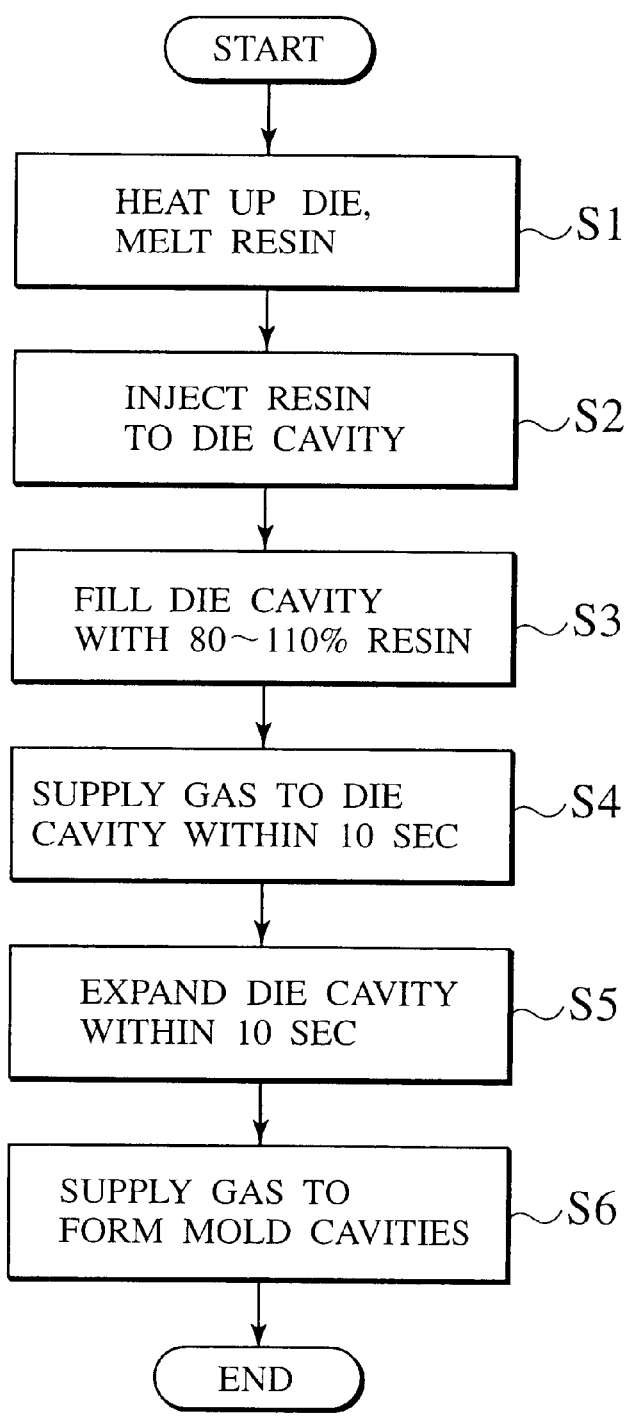
FIG. 8 is a flow chart of operations to form the flat acoustic insulator with the sound absorbing structure.

FIG. 8 shows a control procedure of the molding apparatus 1 to mold a flat acoustic insulator A by one shot of molten resin between a die closing operation and a die opening operation.

At a first step S1, the mold die M is closed, and its stationary die assembly M1 and mobile die assembly M2 are heated up to a molding temperature, while a quantity of resin material is supplied to the resin heater 30 and melted to be sufficiently fluid.

At a second step S2, a specified quantity of molten resin is injected, in one shot, by operation of the injection cylinder 40, from inside the resin heater 30, through the molten resin runner 15, toward the die cavity Sm in an initially prepared state therefor. The one shot operation permits a facilitated low-cost molding.

At a third step S3, it is checked if an injected volume of molten resin ranges between 80% and 110% of a prepared volume of the die cavity Sm. A smaller volume of molten resin than the lower limit of 80% may cause a failure to form a required mold cavity C. An excessive volume of molten resin over the upper limit of 110% may result in a decreased productivity with an increased loss.

At a fourth step S4, within 10 seconds after injection of a necessary volume of molten resin, a specified volume of heated molding gas is supplied from the gas heater P4, through the communication port 10c of the stationary die 10, to the gas condition equalizing zone Se, so that a necessary amount of condition equalized gas is discharged from each gas nozzle 13 into an injected body of molten resin. After the 10 second limit, there is formed a relatively hard resin film along a wall of the stationary die segment 11, and a later discharge of molding gas past the time limit may result in a failure for the discharged gas to break through the hard resin film to form a required mold cavity C.

At a fifth step S5, within 10 seconds from the gas discharge, the die cavity Sm is expanded by operation of the control cylinder 93. The time for expansion of the die cavity Sm is controlled in dependence on the type of resin in use and the temperature of molten resin. The later the expansion time becomes, as the higher the resin temperature is. Faster expansion time than required may results in a failure to form even mold cavities C. The expanded die cavity Sm is larger in volume than the initially prepared die cavity Sm, by a sum of volumes of a total number of mold cavities C, which is equivalent at one hand to a supplied volume of molding gas and at the other hand to a vertical sectional area of the chamber C2 times a slid distance of the die segment 21.

At sixth step S6, the molding gas is kept supplied for a specified period of time to form cavities C of a specified configuration and size. After a sufficient time for resin solidification, the mold die M is opened by operation of the die clamp cylinder 90, so that the acoustic insulator A can be removed.

The flat acoustic insulator A has a sound absorbing structure shown in FIG. 6, which is made as a combination of a resonance sound-absorption structure adapted for sound absorption by resonance and constituted with an opening B and a corresponding tubular resonant part of a mold cavity C, and a film sound-absorption structure adapted for sound absorption by film and constituted with a surface part H around the opening B and a corresponding annular vibratory part of the mold cavity C.

As shown in FIG. 7, the sound absorption by resonance is effected by making use of a resonance phenomenon by combination of a mass ml of air in the opening B and a corresponding air spring component AS1 in the mold cavity C, while the sound absorption by film is effected by making use of a film vibration by combination of a mass m2 of the surface part H and a corresponding air spring component AS2 in the mold cavity C. As the sound absorption by resonance and the sound absorption by film are both effected in an individual combination of sound absorbing elements (B, C, H), the acoustic insulator A can have a high sound absorption characteristic over a wide frequency range. Moreover, the acoustic insulator A has a plurality of mold cavities C, which serve for light-weighting, and rigid walls E as partitions between neighboring mold cavities C, which serve as reinforcing ribs. Therefore, the insulator A of a flat configuration is allowed to have a sufficient rigidity even for services without supports.

Further, the acoustic insulator A is implemented with a sound absorbing structure comprised of a resonance sound-absorption structure (by opening B and mold cavity C) and a film sound-absorption structure (mainly by surface part H), which have their sound frequency vs. sound absorption characteristic curves both set up for sound absorption peaks to appear within a frequency range between 100 Hz and 20000 Hz, so that, letting fr be a resonance sound-absorption peak frequency in terms of $10^x$ Hz and ff be a film sound-absorption peak frequency in terms of $10^y$ Hz, the peak frequencies fr and ff meet a relationship such that $|x-y| \leq 0.7$, that is, an order difference therebetween does not exceed 0.7 in absolute value.

If the resonance sound-absorption peak frequency fr and the film sound-absorption peak frequency ff are to be set below 100 Hz, the mold cavities C need to be reduced in volume, with a failure for a resultant mold to serve as a flat acoustic insulator. On the other hand, the acoustic insulator A does not need any particular sound absorption peaks to appear in a frequency range over 20000 Hz, where audible frequencies for human are out-ranged If the order difference |x-y| between the resonance sound-absorption peak frequency fr and the film sound-absorption peak frequency ff is greater than 0.7 in absolute value, associated sound absorption curves have their peaks at a commensurate relative distance in the frequency field, so that they are separated too far from each other to have their slopes overlap to effectively cover an intermediate frequency range between the peak frequencies ff and fr, with a failure to exhibit an enhanced sound absorption effect therebetween.

In other words, the acoustic insulator A is adapted for an enhanced sound absorption performance over a wide frequency range subject to the above-noted relationship between peaks of sound absorption by resonance and film.

In addition, the flat acoustic insulator A is configured to meet dimensional relationships among the diameter d of opening B, the thickness t of surface part H, the depth L of mold cavity C, and the center-to-center distance D between neighboring openings B, depending on specified values of a resin density R per unit area of the surface part H, a density ρ of air, and a sound velocity c in m/s, such that:

$$fr \approx \frac{c \cdot d}{4D} \sqrt{\frac{1}{\pi L(t+0.8d)}}, \quad \text{and} \quad (1)$$

$$ff \approx \frac{c}{2\pi} \sqrt{\frac{\rho}{R \cdot L}}, \quad (2)$$

providing that the resonance sound-absorption peak frequency fr and the film sound-absorption peak frequency ff fall within the range of 100 Hz to 20000 Hz, while the molding apparatus 1 is set up to mold the acoustic insulator A to be configured as required, by necessary adjustments therefor, such as to the tip outside diameter of each gas discharge nozzle 13, projection of the nozzle tip into the die cavity Sm (or retraction into the nozzle installation port 11c), arrangement of gas discharge nozzles 13, supply quantity or volume of heated molding gas, and distance and timing for the mobile die segment 21 to be slid.

More specifically, the diameter d of opening B is set to be within a range of 0.1 mm to 3.0 mm, the thickness t of surface part H to be within a range of 0.1 mm to 20 mm, the depth L of mold cavity C to be within a range of 0.1 mm to 100 mm, the center-to-center distance D between neighboring openings B to be within a range of 1 mm to 50 mm, and (the thickness X of acoustic insulator A)–(the thickness t of surface part H)–(the depth L of mold cavity C) to be within 1 mm on a sectional plane perpendicular to the front side of the acoustic insulator A.

If the diameter d of opening B is set smaller than 0.1 mm, the formation of mold cavities C may be insufficient. If it is larger than 3.0 mm, the opening B may be irregular in form.

If the thickness t of surface part H is set smaller than 0.1 mm, the surface part H may have sinks. If it is larger than 20 mm, the tip projection of gas discharge nozzle 13 is likewise increased, with an increased tendency to cause molding gas to escape around the nozzle tip, failing to achieve an even thickness.

If the depth L of mold cavity C is set smaller than 0.1 mm, the sound absorption may be insufficient. If it is larger than 100 mm, a resultant displacement of the mobile die segment 21 is likewise increased, with a commensurate probability of failing to mold a conforming acoustic insulator.

If the center-to-center distance D between neighboring openings B is set smaller than 1 mm, the rigid isolating wall E between the cavities C becomes thin, resulting in a reduced strength or rigidity of the acoustic insulator A. If it is larger than 50 mm, the cavities C may be formed with insufficient volumes, constituting a difficulty in setting required sound absorption frequencies.

The expression of (the thickness X of acoustic insulator A)–(the thickness t of surface part H)–(the depth L of mold cavity C) represents a thickness of the bottom wall F of cavity C. If this thickness is set smaller than 1 mm, the quality of appearance of the acoustic insulator A may be degraded by sinks.

In other words, the acoustic insulator A can be molded by the molding apparatus 1, with a high quality free of molding defects at any opening B, cavity C, or bottom wall F, with a secured preferable sound absorption performance, providing that the diameter d of opening B, the thickness t of surface part H, the depth L of mold cavity C, and the center-to-center distance D between neighboring openings B are set within the ranges described.

Figure 12:
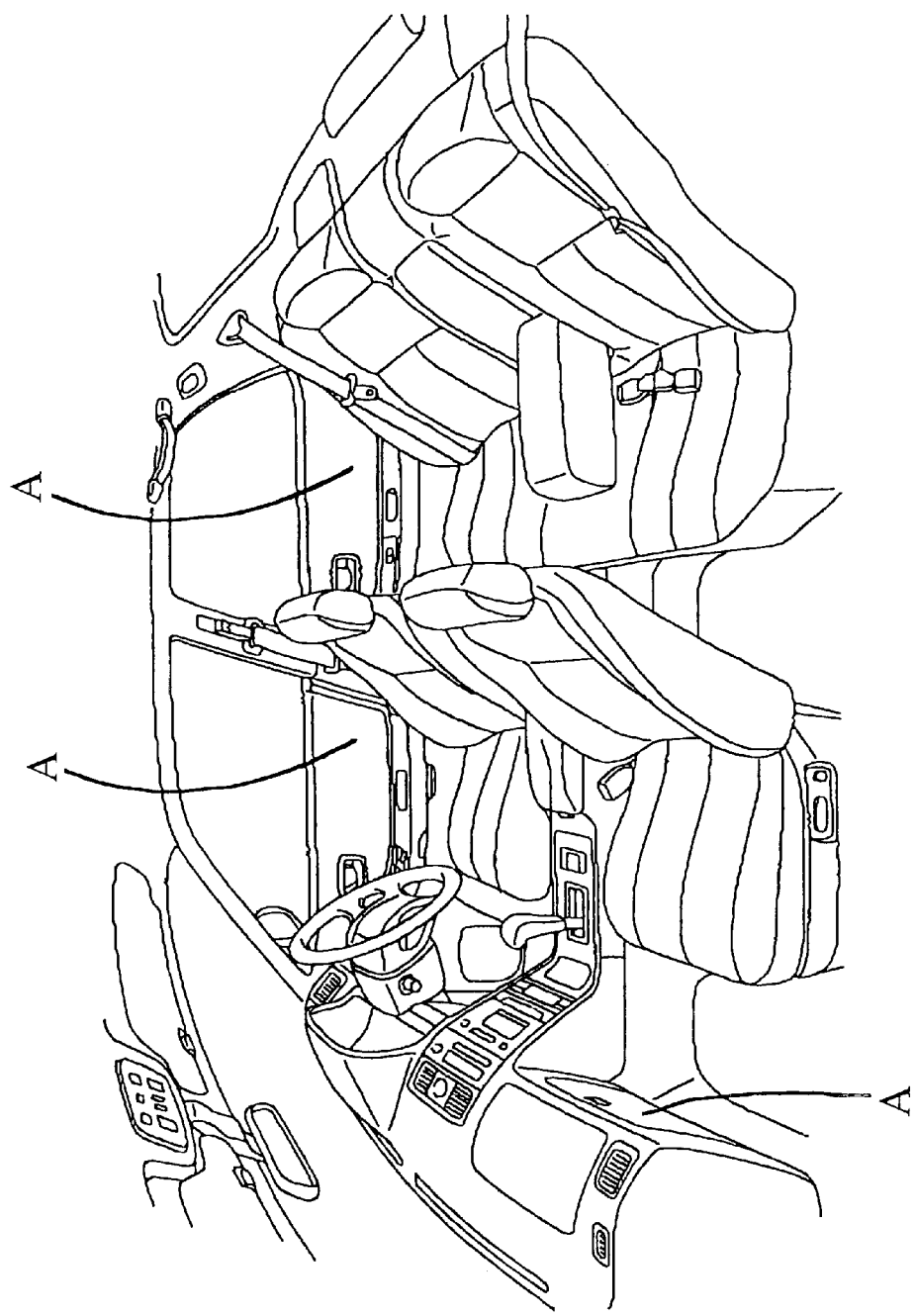
FIG. 12 is an illustration of an interior of an automobile equipped with flat acoustic insulators according to the invention.

The acoustic insulator A is flat in form, light in weight, rigid and strong, and quality of appearance, so that it practically is applicable as a vehicular plate-like member to a body or interior of a vehicle (e.g. to a front board or door panel as in FIG. 12), for a promoted reduction of sounds generated at a drive system, such as an engine, and developed inside or outside the vehicle, or for an enhanced calmness in the vehicle, as well as to a wet environment or places difficult of installation of normal fiber-make sound-absorbing members, for contribution to additional improvements of vehicular quality. Moreover, in application to a vehicular body or interior, the acoustic insulator A eliminates the need of an extra acoustic insulator, permitting the number of components in a vehicle, as well as the number of production processes, to be reduced, with implemented light weight and low cost.

The sound absorption performance of the acoustic insulator A is voluntarily controllable by adequate setting of dimensions, such as of opening B and mold cavity C, in accordance with the expressions (1) and (2).

The expressions (1) and (2) can be converted, such that:

$$fr \approx \frac{c \cdot d}{4D} \sqrt{\frac{1}{\pi L(t+0.8d)}} = \frac{1}{2\pi} \sqrt{\frac{\pi(cd)^2}{L(t+0.8d) \cdot (2D)^2}} \quad (3)$$

$$= \frac{1}{2\pi} \sqrt{\frac{c^2 \rho \cdot \pi d^2}{L(t+0.8d) \cdot (2D)^2 \cdot \rho}}$$

$$= \frac{1}{2\pi} \sqrt{\frac{c^2}{LD^2 \rho} \cdot \frac{1}{(t+0.8d)} \pi \left(\frac{d}{2}\right)^2 \rho}, \quad \text{and}$$

$$ff \approx \frac{c}{2\pi} \sqrt{\frac{\rho}{R \cdot L}} = \frac{1}{2\pi} \sqrt{\frac{c^2 \rho}{RL}}. \quad (4)$$

Incidentally, a mass-and-spring system generally has a resonant frequency f, such that:

$$f = \frac{1}{2\pi} \sqrt{\frac{k}{m}},$$

where k is a spring constant in N/m, and m is a mass in kg. Accordingly, in the Expression (3), the first factor $$\frac{c^2}{LD^2 \rho}$$

in the square root corresponds to a spring per one mold cavity C, and the second factor $$\frac{1}{(t+0.8d)} \pi \left(\frac{d}{2}\right)^2 \rho$$

corresponds to a mass per one mold cavity C. The term 0.8d serves for correction at an open end.

Likewise, in the expression (4), the factor $c^2 \rho$ corresponds to a spring per unit quantity, and the factor RL corresponds to a mass per unit quantity.

In this embodiment, a flat acoustic insulator A has, simply on its one side, a sound absorbing structure comprised of a resonance sound-absorption structure constituted with an opening B and an internal mold cavity C and a film sound-absorption structure constituted with a surface part H. However, such sound absorbing structures may preferably be provided on both sides of a flat acoustic insulator.

The molding apparatus 1 may preferably have varieties of gas discharge nozzles 13 combined to thereby form, in a single acoustic insulator A, a plurality of openings B different in sectional area and/or a plurality of mold cavities C different in volume, and/or arranged for their disposition varied in nozzle density to have an inclined or localized density of mold voids C, thereby offsetting the center of gravity of the insulator A or giving a gradient or inclination to the rigidity. To the contrary, there may preferably be employed a uniform disposition of identical gas discharge nozzles 13 to render even the thickness of separation wall E between neighboring mold cavities C, to thereby provide a flat acoustic insulator A with an entirely uniform rigidity. The configuration of mold cavity C may preferably be set circular, elliptical, or polygonal in section, by selection of nozzle arrangement and nozzle tip configuration associated with pressure control of molding gas, to provide an acoustic insulator A with adequate mold cavities C to achieve a required rigidity and light weight.

Sound Absorption Test (Test specimens)

As shown in Table-1 below, there were prepared eight flat acoustic insulators as test samples TS-1 to TS-8 in accordance with the embodiment described, and nine acoustic insulators as comparative samples CS-1 to CS-9.

TABLE 1

Test Specimens

| Samples | Thickness X, mm | Diameter d, mm | Thickness t, mm | Depth L, mm | Distance D, mm |
|---|---|---|---|---|---|
| TS-1 | 12 | 0.5 | 1 | 10 | 5 |
| TS-2 | 105 | 3 | 0.1 | 100 | 50 |
| TS-3 | 22 | 3 | 20 | 0.1 | 50 |
| TS-4 | 105 | 0.5 | 0.1 | 100 | 5 |
| TS-5 | 12 | 0.1 | 1 | 10 | 1 |
| TS-6 | 3 | 3 | 1 | 1 | 20 |
| TS-7 | 3 | 1 | 1 | 1 | 5 |
| TS-8 | 3 | 1.5 | 0.5 | 1 | 5 |
| CS-1 | 12 | — | — | — | — |
| CS-2 | — | — | — | — | — |
| CS-3 | — | — | — | — | — |

TABLE 1-continued

Test Specimens

| Samples | Thickness X, mm | Diameter d, mm | Thickness t, mm | Depth L, mm | Distance D, mm |
|---|---|---|---|---|---|
| CS-4 | 12 | 10 | 1 | 10 | 50 |
| CS-5 | 12 | 0.5 | 0.05 | 10 | 5 |
| CS-6 | 12 | 0.5 | 0.1 | 11 | 5 |
| CS-7 | 12 | 0.5 | 1 | 10 | 100 |
| CS-8 | 12 | 0.5 | 1 | 0.05 | 5 |
| CS-9 | 60 | 0.5 | 3 | 50 | 2 |

As apparent from Table-1, the test samples TS-1 to TS-8 had their insulator thicknesses X, opening diameters d, surface part thicknesses t, mold cavity depths L, and center-to-center distances D between cavities properly varied. The comparative sample CS-1 had no mold cavities. The comparative sample CS-2 was configured as a resonator having a resonance sound-absorption peak at 160 Hz. The comparative sample CS-3 was formed with a film having a film sound-absorption peak at 1250 Hz. The comparative samples CS-4 to CS-9 had their insulator thicknesses X, opening diameters d, surface part thicknesses t, mold cavity depths L, and center-to-center distances D between cavities properly varied, in which the comparative sample CS-6 had a (thickness X of acoustic insulator A)−(thickness t of surface part H)−(depth L of mold cavity C) under 1 mm, and the comparative sample CS-9 an order difference |x−y| exceeding 0.7 between resonance sound-absorption peak frequency fr and film sound-absorption peak frequency ff.

As the molding apparatus 1, there was employed an injection molding machine with a 110-ton die clamp cylinder. Used resin material was a polypropylene resin containing 20 weight % of talc, and heated to a temperature of 210° C. Die cavity Sm filled with injected resin was expanded in dependence on the thickness X of sound absorbing structure, and nitrogen gas was supplied as a molding gas at a pressure between 5 MPa and 10 MPa, thereby molding insulators with varieties of openings and mold cavities. The insulators were 100 mm×100 mm×(thickness x) mm.

(Test method, results and evaluation)

Figure 9:
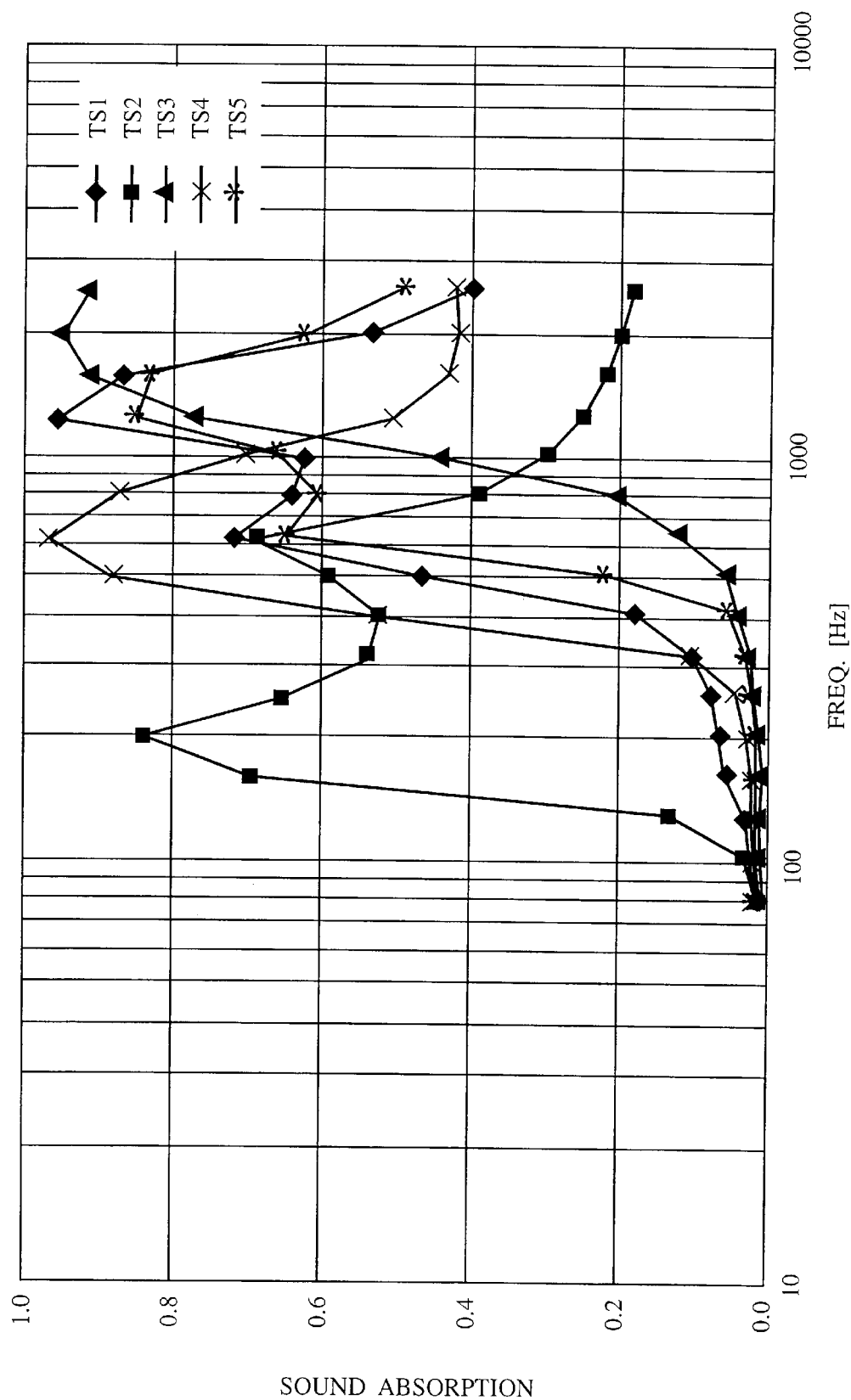
FIG. 9 and FIG. 10 are graphs showing test results of sound-absorption vs. frequency characteristics of mold samples according to the invention.
Figure 10:
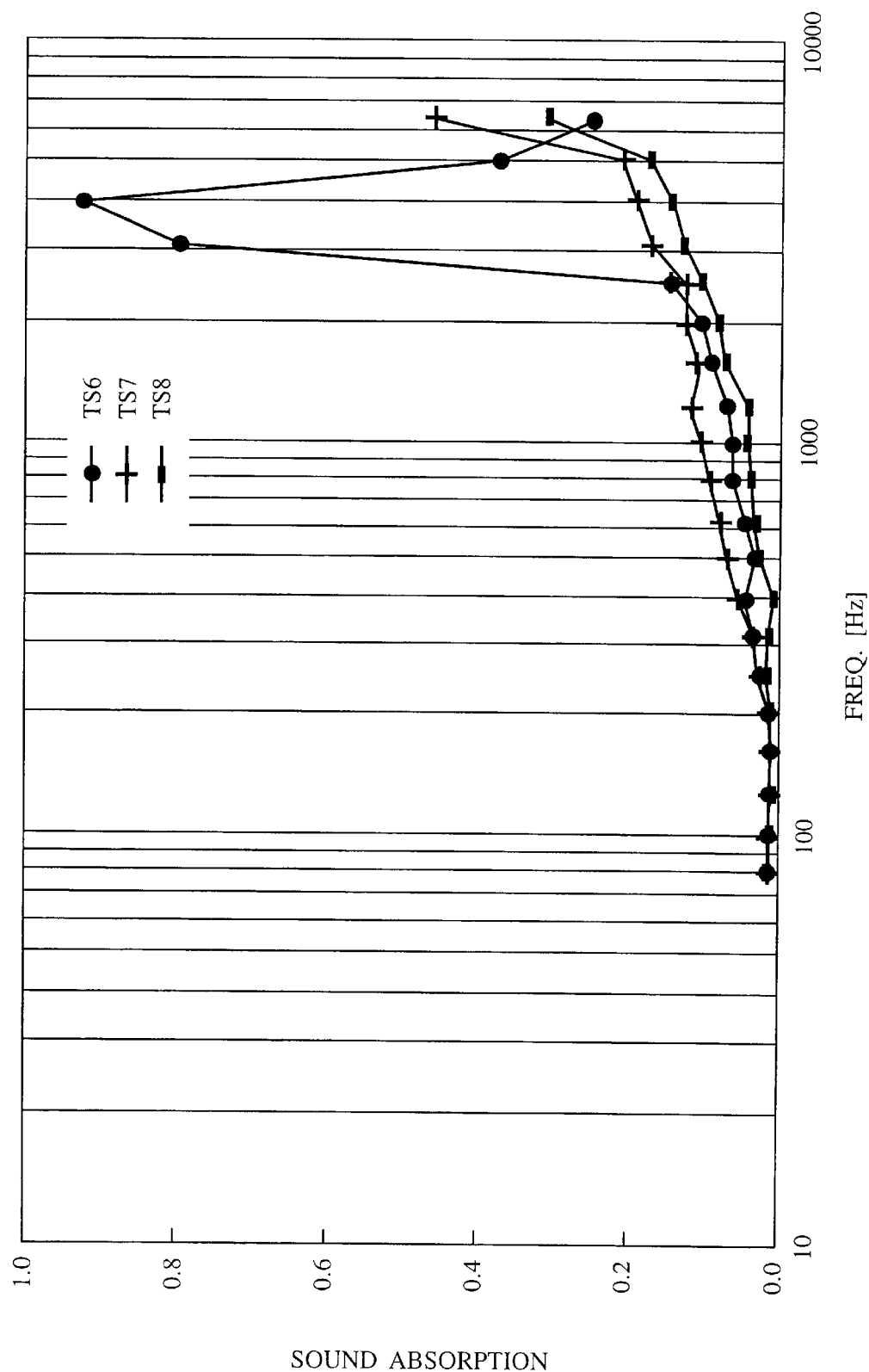
Figure 11:
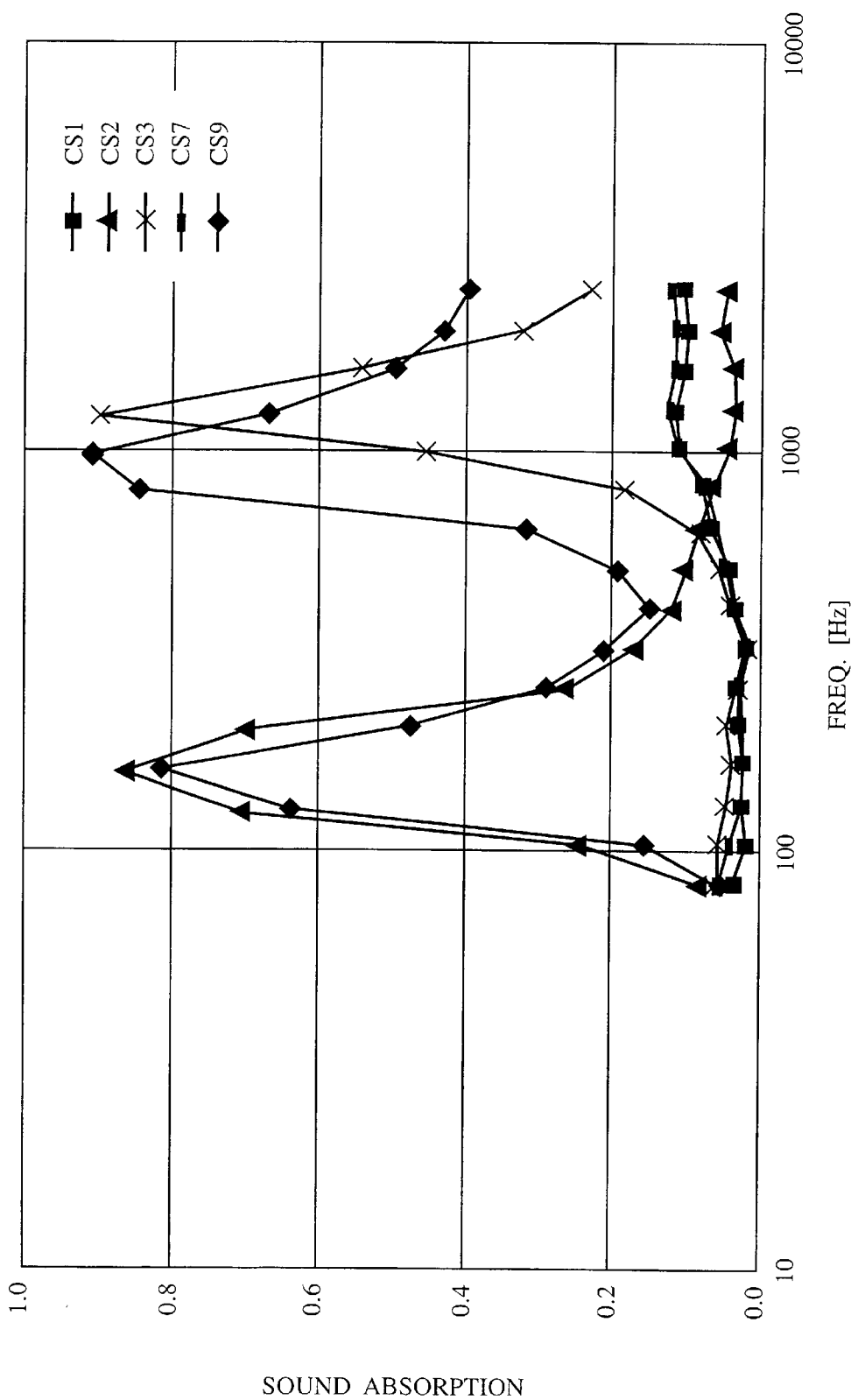
FIG. 11 is graph showing test results of sound-absorption vs. frequency characteristics of comparative samples.

The test samples TS-1 to TS-8 and comparative samples CS-1 and CS-4 to CS-9 were each subjected to a visual check for a decision on appearance to be free of mold defects such as a sink. The comparative samples CS-4 to CS-6 had observed sinks, and the comparative sample CS-8 had no molded cavities. Other samples TS-1 to TS-8, CS-1 to CS-3, CS-7, and CS-9 were each examined by JIS (Japanese Industrial Standard) A1405 (Methods of Test for Sound Absorption of Acoustical Materials by the Tube Method) to measure their sound absorption ratios at various frequencies, for evaluation of their performances of sound absorption. Measurement results are shown in FIG. 9 to FIG. 11. Results of test and evaluation are listed in Table-2(1/4) to Table-2(4/4) below.

TABLE 2(1/4)

Sound Absorption Ratios

| Samples | Freq. 80 | 100 | 125 | 160 | 200 | 250 | 315 |
|---|---|---|---|---|---|---|---|
| TS-1 | 0.011 | 0.011 | 0.007 | 0.013 | 0.015 | 0.023 | 0.033 |
| TS-2 | 0.017 | 0.032 | 0.128 | 0.606 | 0.720 | 0.542 | 0.345 |
| TS-3 | 0.023 | 0.020 | 0.020 | 0.017 | 0.026 | 0.020 | 0.026 |
| TS-4 | 0.023 | 0.020 | 0.020 | 0.017 | 0.026 | 0.046 | 0.113 |
| TS-5 | 0.010 | 0.009 | 0.006 | 0.010 | 0.016 | 0.025 | 0.030 |
| TS-6 | 0.012 | 0.013 | 0.007 | 0.011 | 0.017 | 0.026 | 0.031 |
| TS-7 | 0.010 | 0.010 | 0.013 | 0.010 | 0.013 | 0.023 | 0.036 |
| TS-8 | 0.015 | 0.015 | 0.012 | 0.017 | 0.010 | 0.017 | 0.013 |
| CS-1 | 0.032 | 0.014 | 0.023 | 0.026 | 0.032 | 0.032 | 0.017 |
| CS-2 | 0.080 | 0.250 | 0.709 | 0.863 | 0.703 | 0.267 | 0.183 |
| CS-3 | 0.058 | 0.055 | 0.047 | 0.040 | 0.047 | 0.029 | 0.023 |
| CS-4 | — | — | — | — | — | — | — |
| CS-5 | — | — | — | — | — | — | — |
| CS-6 | — | — | — | — | — | — | — |
| CS-7 | 0.055 | 0.040 | 0.023 | 0.023 | 0.023 | 0.026 | 0.029 |
| CS-8 | — | — | — | — | — | — | — |
| CS-9 | 0.058 | 0.160 | 0.643 | 0.820 | 0.480 | 0.293 | 0.212 |

TABLE 2(2/4)

Sound Absorption Ratios

| Samples | Freq. 400 | 500 | 630 | 800 | 1000 | 1250 | 1600 |
|---|---|---|---|---|---|---|---|
| TS-1 | 0.050 | 0.080 | 0.137 | 0.235 | 0.526 | 0.902 | 0.801 |
| TS-2 | 0.260 | 0.238 | 0.200 | 0.171 | 0.142 | 0.140 | 0.122 |
| TS-3 | 0.040 | 0.058 | 0.122 | 0.209 | 0.446 | 0.571 | 0.664 |
| TS-4 | 0.275 | 0.520 | 0.826 | 0.730 | 0.542 | 0.345 | 0.223 |
| TS-5 | 0.046 | 0.070 | 0.122 | 0.226 | 0.516 | 0.846 | 0.829 |
| TS-6 | 0.046 | 0.032 | 0.047 | 0.066 | 0.066 | 0.073 | 0.095 |
| TS-7 | 0.057 | 0.069 | 0.080 | 0.095 | 0.107 | 0.120 | 0.114 |
| TS-8 | 0.009 | 0.032 | 0.035 | 0.040 | 0.050 | 0.044 | 0.073 |
| CS-1 | 0.032 | 0.040 | 0.060 | 0.078 | 0.113 | 0.116 | 0.104 |
| CS-2 | 0.118 | 0.102 | 0.080 | 0.060 | 0.044 | 0.038 | 0.040 |
| CS-3 | 0.044 | 0.060 | 0.094 | 0.189 | 0.462 | 0.927 | 0.547 |
| CS-4 | — | — | — | — | — | — | — |
| CS-5 | — | — | — | — | — | — | — |
| CS-6 | — | — | — | — | — | — | — |
| CS-7 | 0.032 | 0.049 | 0.052 | 0.075 | 0.107 | 0.128 | 0.122 |
| CS-8 | — | — | — | — | — | — | — |
| CS-9 | 0.151 | 0.195 | 0.332 | 0.840 | 0.906 | 0.674 | 0.508 |

TABLE 2(3/4)

Sound Absorption Ratios

| Samples | Freq. 2000 | 2500 | 3150 | 4000 | 5000 | 6300 |
|---|---|---|---|---|---|---|
| TS-1 | 0.536 | 0.400 | 0.283 | 0.295 | 0.325 | 0.339 |
| TS-2 | 0.110 | 0.104 | 0.205 | 0.221 | 0.230 | 0.237 |
| TS-3 | 0.754 | 0.675 | 0.328 | 0.338 | 0.344 | 0.347 |
| TS-4 | 0.168 | 0.136 | 0.262 | 0.271 | 0.300 | 0.309 |
| TS-5 | 0.623 | 0.490 | 0.224 | 0.246 | 0.256 | 0.268 |
| TS-6 | 0.107 | 0.148 | 0.798 | 0.927 | 0.380 | 0.256 |
| TS-7 | 0.129 | 0.129 | 0.177 | 0.196 | 0.212 | 0.470 |
| TS-8 | 0.085 | 0.107 | 0.136 | 0.148 | 0.182 | 0.317 |
| CS-1 | 0.099 | 0.107 | 0.120 | 0.133 | 0.156 | 0.165 |
| CS-2 | 0.055 | 0.047 | 0.061 | 0.059 | 0.061 | 0.072 |
| CS-3 | 0.328 | 0.233 | 0.215 | 0.233 | 0.251 | 0.264 |
| CS-4 | — | — | — | — | — | — |
| CS-5 | — | — | — | — | — | — |
| CS-6 | — | — | — | — | — | — |
| CS-7 | 0.116 | 0.122 | 0.148 | 0.179 | 0.211 | 0.238 |
| CS-8 | — | — | — | — | — | — |
| CS-9 | 0.440 | 0.404 | 0.297 | 0.272 | 0.278 | 0.302 |

TABLE 2(4/4)

Evaluations

| Samples | Molding | Sound Absorption |
|---|---|---|
| TS-1 | Y | Y |
| TS-2 | Y | Y |
| TS-3 | Y | Y |
| TS-4 | Y | Y |
| TS-5 | Y | Y |
| TS-6 | Y | Y |
| TS-7 | Y | Y |
| TS-8 | Y | Y |
| CS-1 | Y | N |
| CS-2 | — | — |
| CS-3 | — | — |
| CS-4 | N (sink) | — |
| CS-5 | N (sink) | — |
| CS-6 | N (sink) | — |
| CS-7 | Y | N |
| CS-8 | N (no cavity) | N |
| CS-9 | Y | N |

Y: Conforming, N: Non-conforming

As apparent from these Tables, the test samples TS-1 to TS-8 were all good molds, and each exhibited good sound absorption ratios over a wide frequency range, as shown in FIG. 9 and FIG. 10. However, as shown in FIG. 11, the comparative samples CS-2, CS-3, and CS-9 exhibited significant sound absorption ratios simply at particular frequencies, and the comparative samples CS-1 and CS-7 had low sound absorption ratios irrespective of frequencies.

According to the embodiment described, a flat acoustic resin insulator (A) is one-shot molded, with a sound absorbing structure composed of a rigid-connected combination of a plurality of independent sound absorbing cells each constituted with a mold void (C) defined by a rigid lateral wall (E), a rigid bottom wall (F), and a vibratory top surface layer (H), and an opening (B) formed through the surface layer (H) for acoustic external communication of the mold void (C). The opening (B) cooperates with the mold void (C) to serve for resonance absorption of sounds, and the surface layer (H) covering the mold void (C) serves for film-vibratory absorption of sounds. Characteristic curves of the resonance sound-absorption and the film-vibratory sound-absorption have their peaks at different audible frequencies and their slopes overlapping therebetween, with a superimposed sound-absorbing effect over a wide frequency range.

It will be seen that in the foregoing embodiment, the mobile die segment 21 and the die cavity control cylinder 93 may preferably be removed, subject to a modification by provision of: a modified stationary die segment, which is similar in configuration to the die segment 11 but different therefrom in that the die segment is located at a left end of the stationary die 10 and that a left half of the die segment projects beyond the left end of the stationary die 10; and a modified mobile die, which is similar in configuration to the mobile die 20 but different therefrom in that a right portion of the mobile die slidably fits on the left half of the die segment, so that an expandable die cavity similar to the die cavity Sm is defined by combination of the modified stationary die segment and the modified mobile die, permitting like function and like effects to be implemented or achieved relative to the embodiment described. In this modification, the die cavity is expanded by operation of the die clamp cylinder 90, and molding gas may be supplied during or after the die cavity expansion.

The contents of Japanese Patent Application No. 11-321051, Japanese Patent Application No. 2000-80399, and JIS A1405 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A sound absorbing structure of a resin mold with a plurality of internal voids having openings for external communication at a one-side surface of the mold, wherein
    a respective internal void
        has a sectional area parallel to the one-side surface and larger than a corresponding opening and
        is defined by a surface part formed with the corresponding opening,
    the respective internal void and the corresponding opening constitute a resonance sound-absorption structure for sound absorption by resonance, and
    the surface part constitutes a film sound-absorption structure for sound absorption by film,
    wherein a resonance sound-absorption peak frequency of the resonance sound-absorption structure and a film sound-absorption peak frequency of the film sound-absorption structure reside within a range of 100 Hz to 20000 Hz.

2. A sound absorbing structure of a resin mold with a plurality of internal voids having openings for external communication at a one-side surface of the mold, wherein
    a respective internal void
        has a sectional area parallel to the one-side surface and larger than a corresponding opening and
        is defined by a surface part formed with the corresponding opening,
    the respective internal void and the corresponding opening constitute a resonance sound-absorption structure for sound absorption by resonance, and
    the surface part constitutes a film sound-absorption structure for sound absorption by film,
    wherein the corresponding opening has a diameter within a range of 0.1 mm to 3.0 mm, the surface part has a thickness within a range of 0.1 mm to 20 mm, the respective internal void has a depth within a range of 0.1 mm to 100 mm, and a center-to-center distance between neighboring openings falls within a range of 1 mm to 50 mm.

3. A sound absorbing structure of a resin mold with a plurality of internal voids having openings for external communication at a one-side surface of the mold, wherein
    a respective internal void
        has a sectional area parallel to the one-side surface and larger than a corresponding opening and
        is defined by a surface part formed with the corresponding opening,
    the respective internal void and the corresponding opening constitute a resonance sound-absorption structure for sound absorption by resonance, and
    the surface part constitutes a film sound-absorption structure for sound absorption by film,
    wherein the resonance sound-absorption structure has a resonance sound-absorption peak frequency of $10^x$ Hz, the film sound-absorption structure has a film sound-absorption peak frequency of $10^y$ Hz, and $|x-y| \leq 0.7$.

4. A sound absorbing structure of a resin mold with a plurality of internal voids having openings for external communication at a one-side surface of the mold, wherein
    a respective internal void
        has a sectional area parallel to the one-side surface and larger than a corresponding opening and
        is defined by a surface part formed with the corresponding opening,
    the respective internal void and the corresponding opening constitute a resonance sound-absorption structure for sound absorption by resonance, and
    the surface part constitutes a film sound-absorption structure for sound absorption by film,
    wherein a thickness of the sound absorbing structure minus a thickness of the surface part minus a depth of the respective internal void is not smaller than 1 mm.

5. An acoustic insulator having a sound absorbing structure according to claim 1, comprising a resin lamination provided on at least one side thereof.

6. An acoustic insulator according to claim 5, wherein the resin lamination comprises a painting coat.

7. A vehicular plate-form member having a sound-absorbing structure according to claim 1.

8. A molding apparatus configured to mold an acoustic insulator having a sound absorbing structure of a resin mold with a plurality of internal voids having openings for external communication at a one-side surface of the mold, wherein
    a respective internal void
        has a sectional area parallel to the one-side surface and larger than a corresponding opening and
        is defined by a surface part formed with the corresponding opening,
    the respective internal void and the corresponding opening constitute a resonance sound-absorption structure for sound absorption by resonance, and
    the surface part constitutes a film sound-absorption structure for sound absorption by film,
    wherein the molding apparatus comprises:
        a mold die comprising a stationary die assembly and a mobile die assembly cooperative with each other to define a die cavity;
        a plurality of gas discharge nozzles installed in the mold die and confronting the die cavity; and
        a gas supply system configured to supply a molding gas from outside the mold die to the plurality of gas discharge nozzles.

9. A sound absorbing structure of a resin mold with a plurality of internal voids having openings for external communication at a one-side surface of the mold, wherein a respective internal void
- has a sectional area parallel to the one-side surface and larger than a corresponding opening and
- is defined by a surface part formed with the corresponding opening, the respective internal void and the corresponding opening constitute resonance sound-absorption means for sound absorption by resonance, and the surface part constitutes film sound-absorption means for sound absorption by film, wherein a resonance sound-absorption peak frequency of the resonance sound-absorption means and a film sound-absorption peak frequency of the film sound-absorption means reside within a range of 100 Hz to 20000 Hz.

* * * * *